(12) United States Patent
Nakura et al.

(10) Patent No.: US 8,670,694 B2
(45) Date of Patent: Mar. 11, 2014

(54) GEAR DRIVE APPARATUS, DRIVING DEVICE INCLUDING GEAR DRIVE APPARATUS, AND IMAGE FORMING DEVICE INCLUDING GEAR DRIVE APPARATUS

(75) Inventors: Makoto Nakura, Ibaraki (JP); Masaru Kawamoto, Kanagawa (JP); Naoto Ueda, Ibaraki (JP); Hirofumi Ohkushi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 236 days.

(21) Appl. No.: 13/253,108

(22) Filed: Oct. 5, 2011

(65) Prior Publication Data

US 2012/0263497 A1 Oct. 18, 2012

(30) Foreign Application Priority Data

Oct. 6, 2010 (JP) ................. 2010-226925

(51) Int. Cl.
*G03G 15/00* (2006.01)

(52) U.S. Cl.
CPC .............. G03G 15/00 (2013.01); *G03G 15/757* (2013.01)
USPC ...................................... 399/167

(58) Field of Classification Search
CPC ................. F16H 57/04; G03G 15/00
USPC ........................................... 399/167
See application file for complete search history.

(56) References Cited

U.S. PATENT DOCUMENTS

| | | | | |
|---|---|---|---|---|
| 5,288,556 | A * | 2/1994 | Lemelson | 428/408 |
| 6,732,606 | B1 * | 5/2004 | Zhu et al. | 74/460 |
| 7,471,919 | B2 * | 12/2008 | Kawakami et al. | 399/167 |
| 7,865,115 | B2 * | 1/2011 | Oguma et al. | 399/167 |
| 8,266,978 | B2 * | 9/2012 | Hirose | 74/467 |
| 2008/0138113 | A1 * | 6/2008 | Murrell et al. | 399/167 |
| 2009/0107275 | A1 * | 4/2009 | Cooper et al. | 74/462 |
| 2009/0139799 | A1 * | 6/2009 | Tiwari et al. | 184/6.12 |
| 2009/0165588 | A1 * | 7/2009 | Yasuda et al. | 74/467 |
| 2009/0188338 | A1 * | 7/2009 | Hirose | 74/467 |
| 2011/0206438 | A1 * | 8/2011 | Igarashi et al. | 400/578 |
| 2012/0251178 | A1 * | 10/2012 | Toso et al. | 399/167 |
| 2013/0025405 | A1 * | 1/2013 | Arisawa et al. | 74/606 R |

FOREIGN PATENT DOCUMENTS

| | | | |
|---|---|---|---|
| JP | 04-074522 | 11/1992 | |
| JP | 2001-165149 | 6/2001 | |
| JP | 3395028 | 4/2003 | |
| JP | 2009-150412 | * 7/2009 | G03G 15/00 |
| JP | 2009-180290 | 8/2009 | |
| JP | 2009-271109 | 11/2009 | |

* cited by examiner

*Primary Examiner* — Clayton E Laballe
*Assistant Examiner* — Kevin Butler
(74) *Attorney, Agent, or Firm* — IPUSA, PLLC

(57) ABSTRACT

A gear drive apparatus includes a gear train including a plurality of gears, and a holding unit accommodating the gear train and a lubricant to be supplied to tooth flanks of each of the plurality of gears, the holding unit including an inlet opening from which the lubricant is poured. The lubricant from the inlet opening is supplied to an engagement area where two gears of the plurality of gears are engaged with each other, or to a tooth flank area of one of the two gears at an upstream part from the engagement area along a rotational direction of the one of the two gears.

15 Claims, 15 Drawing Sheets

FIG.5A
FIG.5B
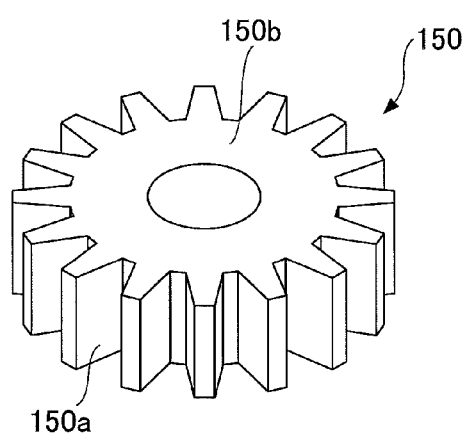
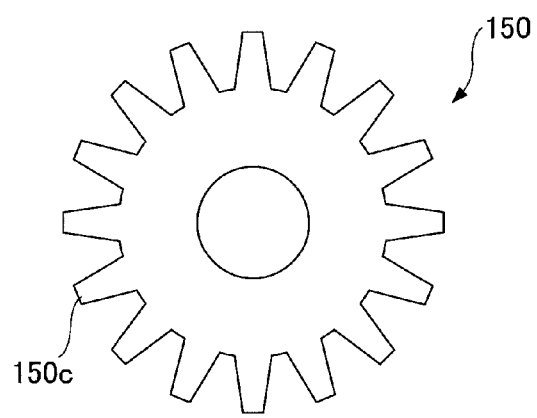

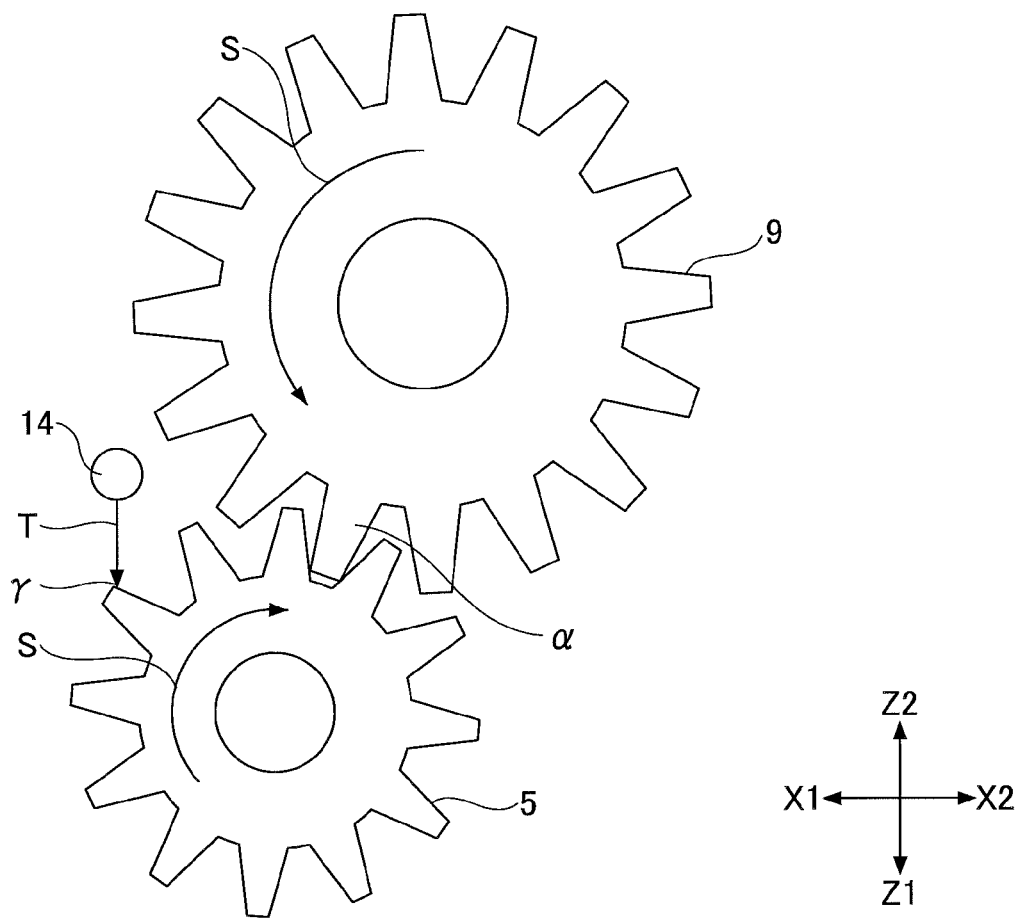

FIG.10
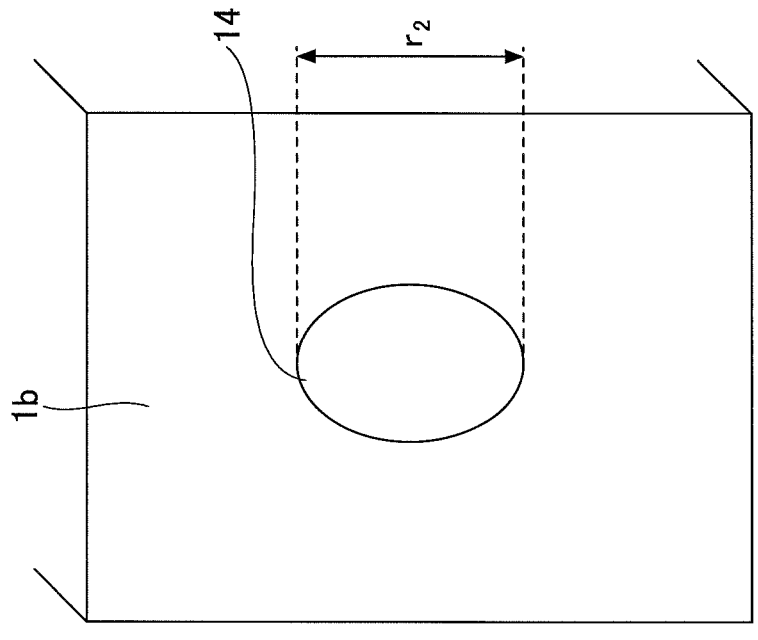
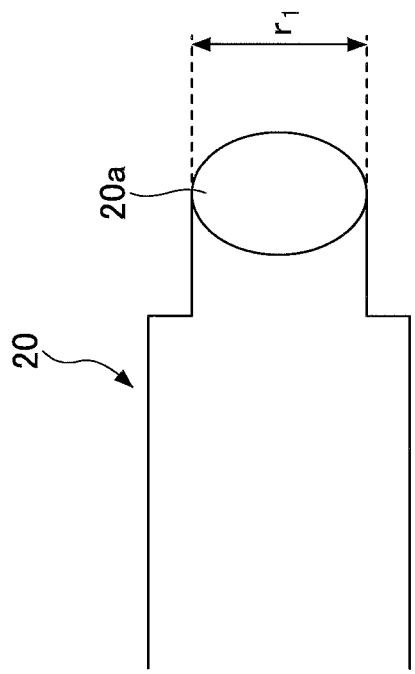

FIG.11
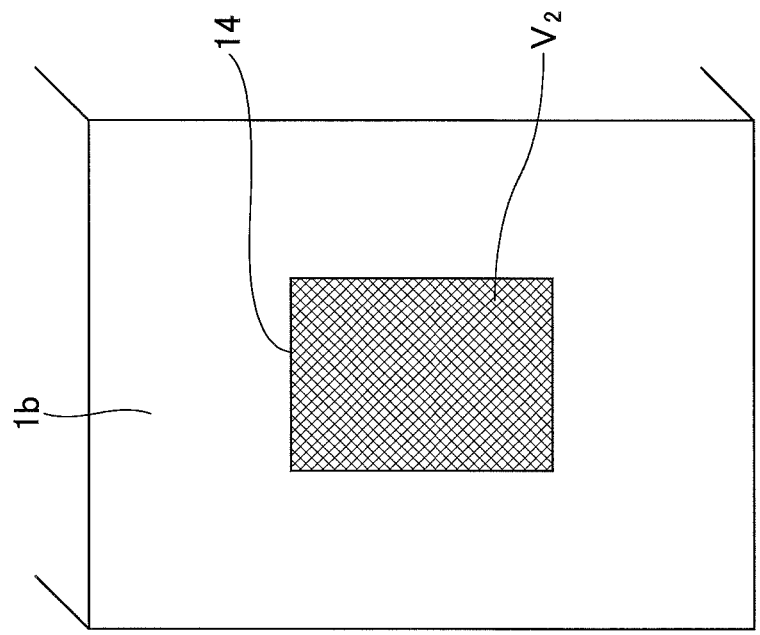
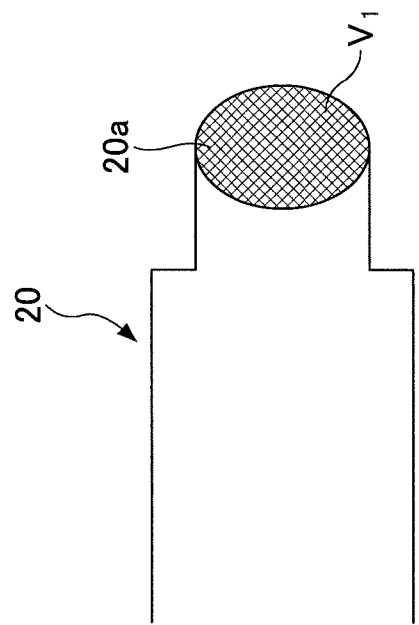

GEAR DRIVE APPARATUS, DRIVING DEVICE INCLUDING GEAR DRIVE APPARATUS, AND IMAGE FORMING DEVICE INCLUDING GEAR DRIVE APPARATUS

BACKGROUND OF THE INVENTION

1. Field of the Invention

The present disclosure relates to a gear drive apparatus for driving a gear, a driving device including the gear drive apparatus, and an image forming device including the gear drive apparatus.

The present application is based upon and claims the benefit of priority of the prior Japanese Patent Application No. 2010-226925, filed on Oct. 6, 2010, the contents of which are incorporated herein by reference in their entirety.

2. Description of the Related Art

In recent years, a driving device in an image forming device has a complicated gear structure with diversification of functions of the image forming device. In order to maintain the gear strength and wear resistance, various proposals of supplying a lubricant, such as grease to a plurality of gears of a driving device have been presented.

For example, Japanese Laid-Open Patent Publication No. 2009-180290 discloses a gear drive apparatus in which an inlet opening for supplying a lubricant is formed at an upper part of a housing, and a gear train in the drive apparatus is lubricated with the lubricant supplied from the inlet opening.

However, the gear drive apparatus of Japanese Laid-Open Patent Publication No. 2009-180290 has difficulty in efficiently applying the lubricant to all the tooth flanks of the gears.

SUMMARY OF THE INVENTION

In one aspect, the present disclosure provides a gear drive apparatus which is capable of efficiently applying a lubricant to all tooth flanks of gears.

In an embodiment which solves or reduces one or more of the above-mentioned problems, the present disclosure provides a gear drive apparatus including: a gear train including a plurality of gears; and a holding unit accommodating the gear train and a lubricant to be supplied to tooth flanks of each of the plurality of gears, the holding unit including an inlet opening from which the lubricant is poured, wherein the lubricant from the inlet opening is supplied to an engagement area where two gears of the plurality of gears are engaged with each other, or to a tooth flank area of one of the two gears at an upstream part from the engagement area along a rotational direction of the one of the two gears.

Other objects, features and advantages of the present disclosure will become more apparent from the following detailed description when read in conjunction with the accompanying drawings.

BRIEF DESCRIPTION OF THE DRAWINGS

FIG. 5A and FIG. 5B are diagrams showing a gear in the gear drive apparatus of the first embodiment.

FIG. 6 is a diagram for explaining a function of an inlet opening in the gear drive apparatus of the first embodiment.

FIG. 10 is a diagram showing a lubricant supplying device and an inlet opening in the gear drive apparatus of the first embodiment.

FIG. 11 is a diagram showing a lubricant supplying device and an inlet opening in a gear drive apparatus of a modification of the first embodiment of the present disclosure.

DETAILED DESCRIPTION OF THE PREFERRED EMBODIMENTS

A description will be given of embodiments of the present disclosure with reference to the accompanying drawings.

In the following, a gear drive apparatus of an embodiment of the present disclosure is applied to a driving device which is driven by a gear. It is assumed that this driving device is a device which is driven by the gear drive apparatus according to the present disclosure, and an image forming device is an example of the driving device. Examples of the image forming device may be a printer, a facsimile, a reproducing device, a plotter, a multifunction peripheral, etc.

Figure 1:
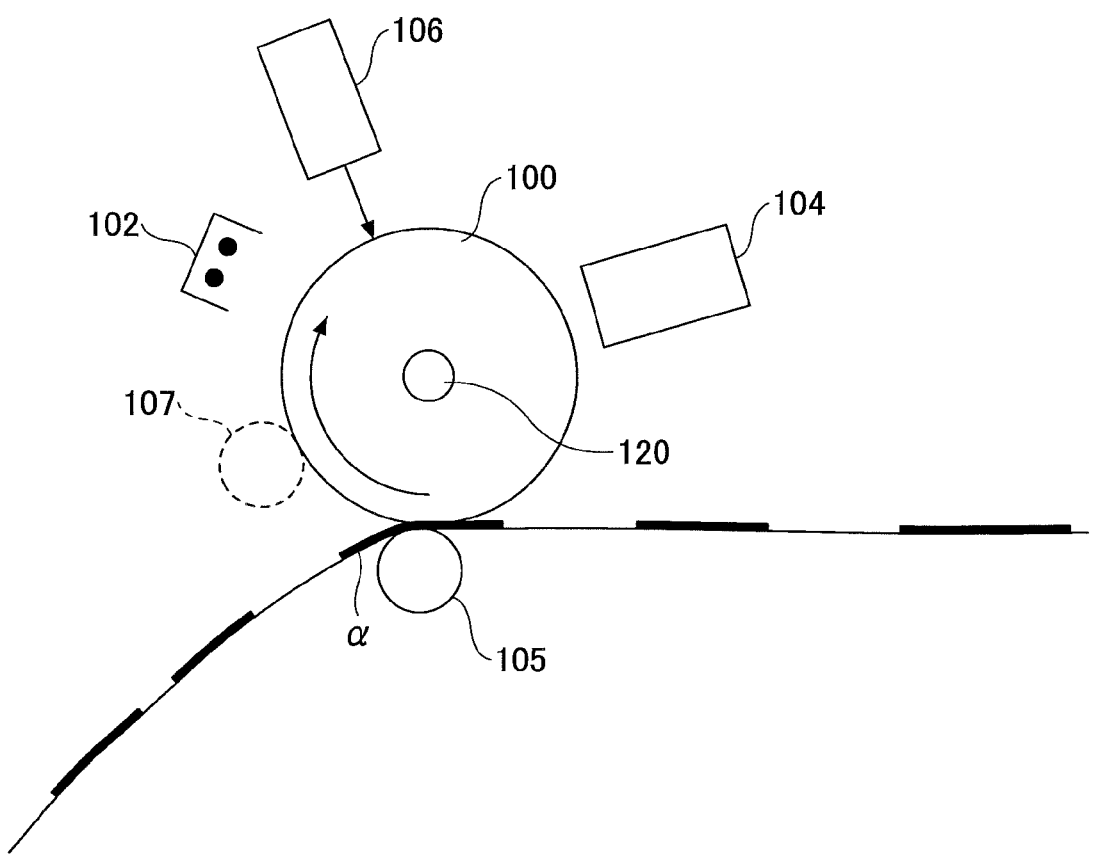
FIG. 1 is a diagram showing the functional composition of a principal part of an image forming device to which an embodiment of the present disclosure is applied.

FIG. 1 shows the functional composition of a principal part of an image forming device, arranged around a photoconductor 100, to which an embodiment of the present disclosure is applied.

In the image forming device of FIG. 1, the photoconductor 100 is rotated clockwise around a rotary shaft 120. Around the photoconductor 100, a charging device 102, a writing device 106, a developing device 104, a transferring device 105, and a cleaning device 107 are arranged in a sequence of an image formation process performed by the image forming device.

The charging device 102 electrostatically charges the surface of the photoconductor 100 in a uniform manner. For example, a scorotron charge device may be used as the charging device 102. After the surface of the photoconductor 100 is charged by the charging device 102, the writing device 106 forms an electrostatic latent image on the surface of the photoconductor 100 by emitting a light beam to the photoconductor 100. The developing device 104 causes an electrostatically charged toner to be adsorbed to the electrostatic latent image on the photoconductor 100 to convert the electrostatic latent image into a toner image.

The transferring device 105 transfers the toner image developed on the photoconductor 100 to a recording sheet α which is transported to the photoconductor 100 in a timing in synch with the forming of the toner image on the photoconductor 100. The remaining toner on the surface of the photoconductor 100 after the transferring of the toner image to the recording sheet α is completed is removed from the photoconductor 100 by the cleaning device 107. The cleaned surface of the photoconductor 100 is returned back to the location of the charging device 102 by the rotation of the photoconductor 100.

Figure 2:
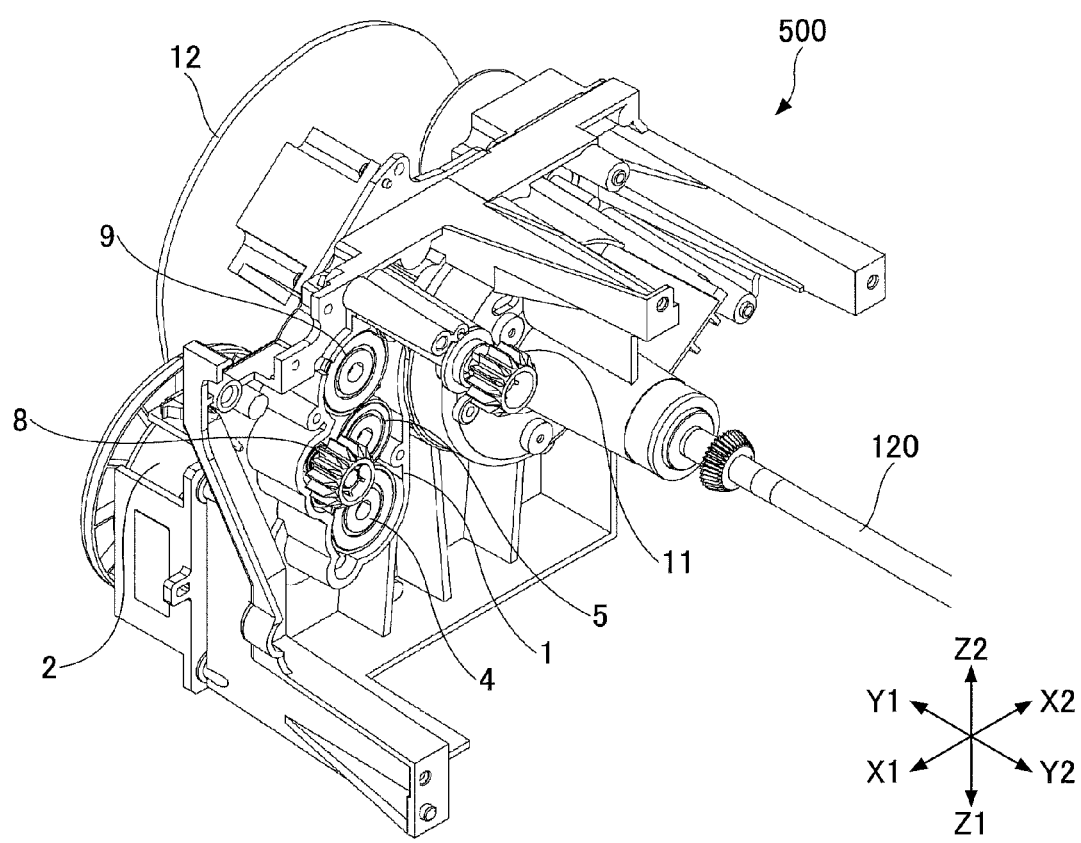
FIG. 2 is a perspective view of a gear drive apparatus of a first embodiment of the present disclosure.
Figure 3:
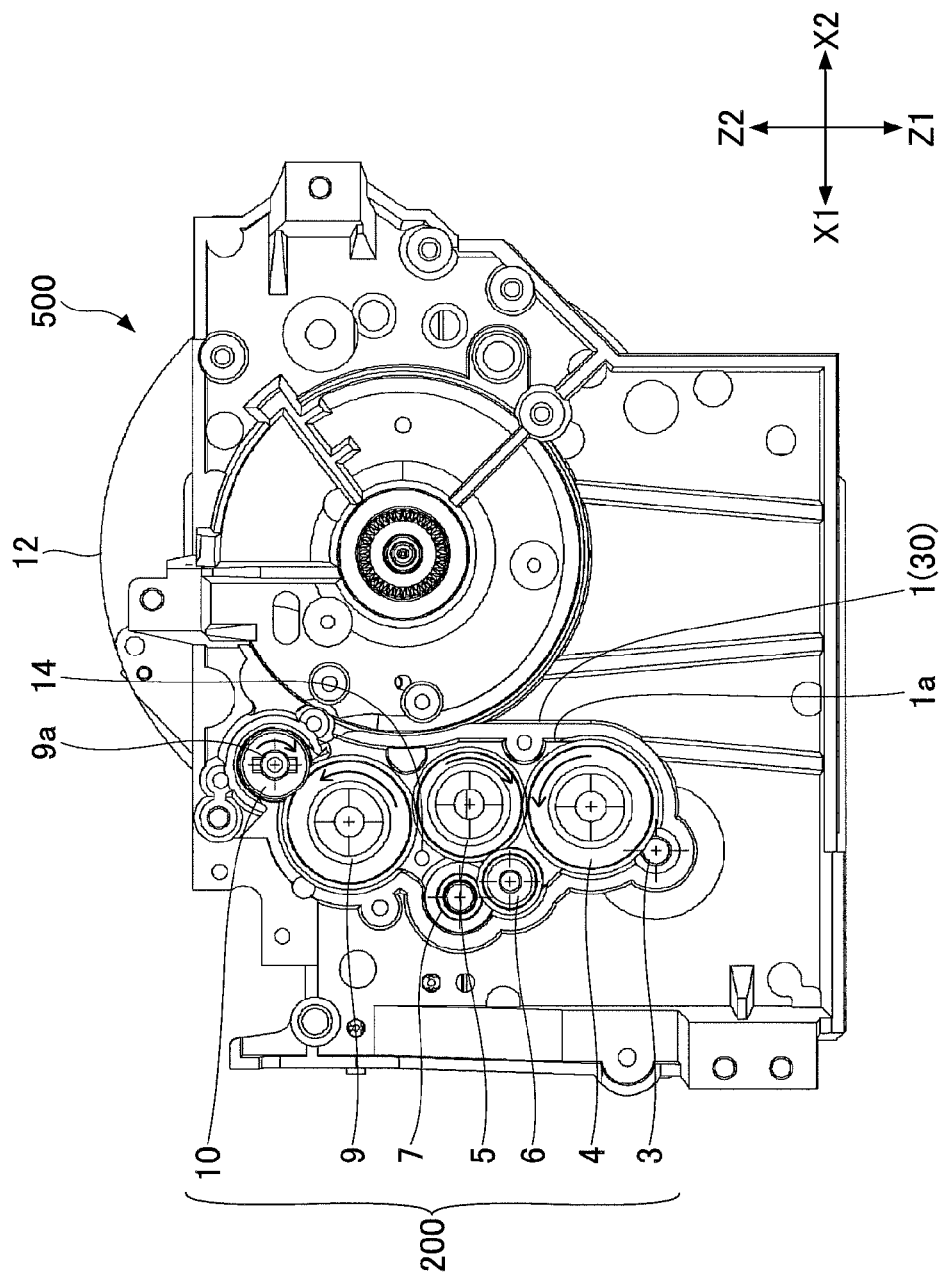
FIG. 3 is a plan view of the gear drive apparatus of the first embodiment of FIG. 2.
Figure 4:
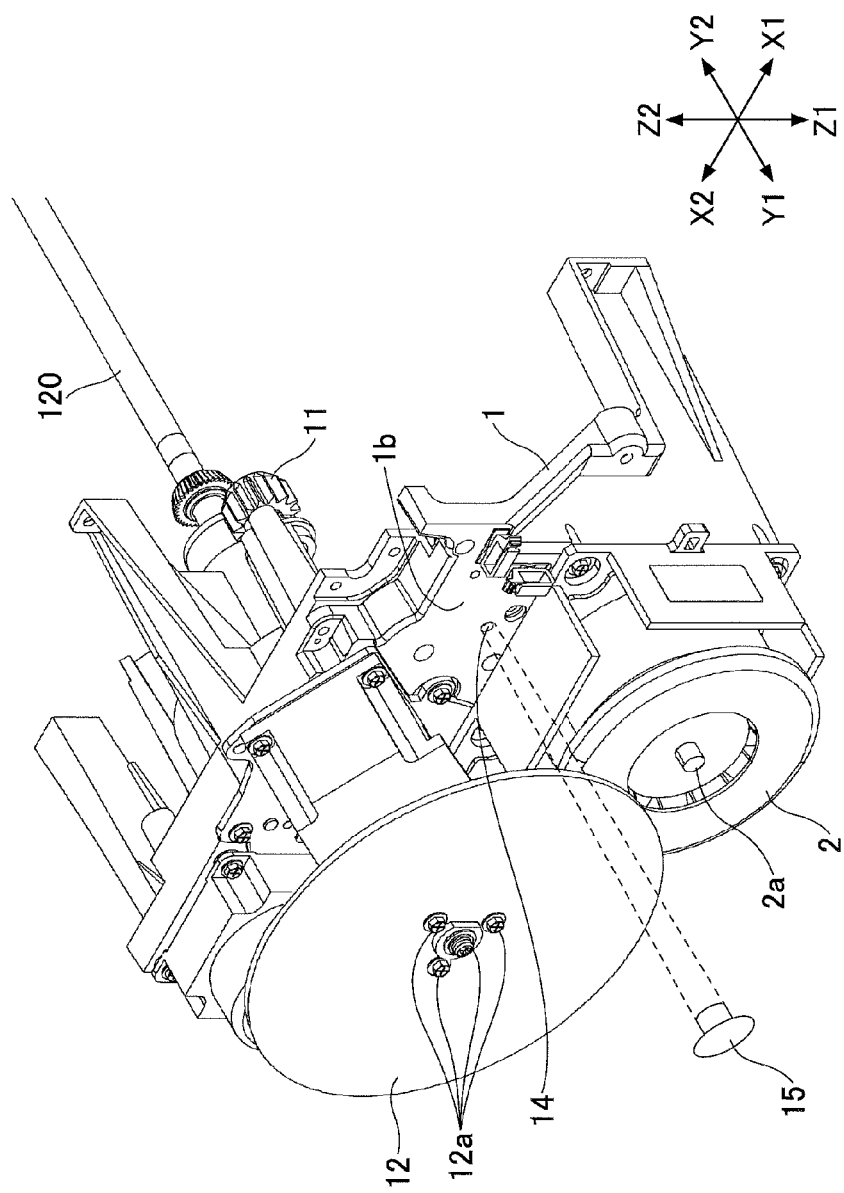
FIG. 4 is a perspective view of the gear drive apparatus of the first embodiment of FIG. 2.

FIG. 2 is a perspective view of a developing device gear drive apparatus 500 for driving the developing device 104 when viewed from the photoconductor 100 or from the inside of the image forming device. The developing device gear drive apparatus 500 is a gear drive apparatus of a first embodiment of the present disclosure. FIG. 3 is a plan view of the developing device gear drive apparatus 500 of FIG. 2. FIG. 4 is a perspective view of the developing device gear drive apparatus 500 of FIG. 2 when viewed from the opposite side to the side of FIG. 2 or from the outside of the image forming device.

In FIGS. 2-4, the illustration of the photoconductor 100 is omitted for the sake of convenience. In the image forming device, a gear drive apparatus which drives the photoconductor 100, and a gear drive apparatus which drives the cleaning device 107 are also arranged. However, in FIGS. 2-4, only the developing device gear drive apparatus 500 is illustrated for the sake of convenience. Moreover, in FIG. 2 and FIG. 3, the illustration of tooth flanks of respective gears is omitted for the sake of simplification.

As shown FIGS. 2-4, a drive motor 2 is a motor which drives the developing device 104 and is arranged at the lowermost part of the developing device gear drive apparatus 500. A gear 3 is secured to a rotary shaft of the drive motor 2. The gear 3 is rotated clockwise in the plan view of FIG. 3. The gear 3 is engaged with an idler gear 4. The idler gear 4 is engaged with an idler gear 5.

The idler gear 5 is engaged with two gears which are an idler gear 6 and an idler gear 9. A driving force from the idler gear 5 is branched to the idler gear 6 and the idler gear 9. The idler gear 6 is engaged with a stirring-screw drive gear 7 of the developing device 104. A coupling 8 which is arranged to be coaxial with the stirring-screw drive gear 7 is rotated by the idler gear 6.

On the other hand, the idler gear 9 is engaged with a developing-roller drive gear 10 of the developing device 104. A coupling 11 which is arranged to be coaxial with the developing-roller drive gear 10 is rotated by the idler gear 9. The coupling 8 and the coupling 11 are respectively fitted to a stirring-screw shaft coupling and s developing-roller shaft coupling (which are not illustrated) on the side of the developing device 104. These shaft couplings are rotated by the idler gears 6 and 9 through the couplings 8 and 11.

As shown in FIG. 3, a gear train of the developing device gear drive apparatus 500 is constructed to include at least the seven gears including the gear 3, the idler gear 4, the idler gear 5, the idler gear 6, the stirring-screw drive gear 7, the idler gear 9, and the developing-roller drive gear 10. In the following, for the sake of convenience, these gears will be referred to as the gear 3, the gear 4, the gear 5, the gear 6, the gear 7, the gear 9, and the gear 10 respectively.

Generally, a gear train is composed of a plurality of gears. Specifically, in the example of FIGS. 2 to 4, a gear train 200 is composed of the seven gears 3, 4, 5, 6, 7, 9 and 10. In the following, it is supposed that Y-axis directions are parallel to the directions of a rotary shaft of each gear (e.g., a rotary shaft 9a of the gear 9 shown in FIG. 3), Z-axis directions are parallel to the height directions of the image forming device (the driving device), and X-axis directions are perpendicular to both the Y-axis directions and the Z-axis directions.

Specifically, in the example of FIGS. 2-4, the seven gears are helical gears. The gears 3 and 7 are made of a metal and produced by a metal-cutting process. The remaining gears 4, 5, 6, 9 and 10 are made of a sintered metal and produced by a blanking process. Alternatively, the gear train 200 may be composed of gears of other type.

The gear train 200 is accommodated in a gearbox 1. For example, the gearbox 1 is produced or molded by an aluminum die-casting process. The seven gears are covered by a covering member (not shown). This covering member may be made of a metal. In this case, the seven gears are accommodated in the gearbox 1 and the covering member, and inclusion of foreign matter from the outside of the gearbox 1 in the seven gears and scattering of a lubricant (which will be described later) applied to the seven gears can be prevented. In the following, the gearbox 1 and the covering member will be referred to as a holding unit 30.

As shown in FIG. 4, the drive motor 2 is fixed to the external wall surface of the gearbox 1 by a screw 2a. A flywheel 12 is fixed to a portion of the external wall surface of the gearbox 1 corresponding to an extension portion of the rotary shaft 120 of the photoconductor 100 by a screw 12a. This flywheel 12 is arranged to prevent deviations from occurring at the time of the rotation of the photoconductor 100.

Next, the composition of a gear in the gear drive apparatus of the first embodiment will be described. FIG. 5A is a perspective view of a gear 150, and FIG. 5B is a plan view of the gear 150. In FIGS. 5A and 5B, the reference numeral 150a denotes a tooth flank of the gear 150, the reference numeral 150b denotes a side face of the gear 150, and the reference numeral 150c denotes a tip of one of the teeth of the gear 150.

In the seven gears shown in FIGS. 2-4, a distance between each tip 150c of the teeth of each gear and the inner peripheral wall 1a of the gearbox 1 is in a range of about 2 to 3 mm, and a distance between the side face 150b of each gear and the inner peripheral wall 1a of the gearbox 1 is in a range of about 3 to 5 mm. A gap between the inner peripheral wall 1a of the gearbox 1 and the gear train 200 is filled with a lubricant. The lubricant is supplied to the tooth flanks 150a of the gear 150, and the tooth flanks 150a are smoothed or lubricated. The lubricant is, for example, oil, grease, etc. It is desirable that the lubricant has a high value of viscosity, and it is preferred that grease is used as the lubricant. Alternatively, another lubricant may be used as long as the lubricant can smooth the tooth flanks 150a of each gear. The gear train 200 and the lubricant are accommodated in the gearbox 1 and the covering member (the holding unit 30).

If the lubricant is sufficiently supplied to the tooth flanks 150a of each gear of the gear train 200, good wear resistance and durability of the gears can be provided. On the other hand, if the lubricant contained in the gearbox 1 is insufficient, wear of the gears will be caused. Wear of the gears, such as resin gears, metal gears, and sintered metal gears which have no self lubricating ability, will easily take place due to lack of the lubricant. It is necessary to supply the lubricant to such gears periodically.

Next, an inlet opening of the gear drive apparatus of the first embodiment from which the lubricant is initially poured will be described. As shown in FIG. 3 and FIG. 4, an inlet opening 14 is formed in the gear drive apparatus of the first embodiment. The inlet opening 14 is an opening from which the lubricant is initially poured by the operator. Once the lubricant is poured from the inlet opening 14, the lubricant falls in the Z1 direction by gravity and is accommodated in the gearbox 1. Specifically, as shown in FIG. 3 and FIG. 4, the inlet opening 14 is formed to penetrate a side wall 1b (refer to FIG. 4) of the gearbox 1.

FIG. 6 is a diagram showing a portion of the gear drive apparatus of the first embodiment in a vicinity of the inlet opening 14, in order to explain the function of the inlet opening 14. It is supposed that the gear 5 and the gear 9, shown in FIG. 6, are arranged in a vertical direction that is substantially parallel to the Z-axis directions (Z1 and Z2). It is further supposed that the gear 9 is rotated counterclockwise as indicated by the upper arrow S in FIG. 6, while the gear 5 is rotated clockwise as indicated by the lower arrow S in FIG. 6. In the following, an area where the gear 5 and the gear 9 are engaged with each other will be referred to as an engagement area α.

In the example of FIG. 6, the lubricant from the inlet opening 14 is initially poured to the tooth flank area γ of the gear 5, as indicated by the arrow T in FIG. 6, and this tooth flank area is located at an upstream part from the engagement area α (where the gear 5 and the gear 9 are engaged with each other) along the rotational direction of the gear 5.

In the following, the tooth flank area γ to which the lubricant from the inlet opening 14 is initially applied will also be referred to as the inlet area γ, and the area among the tooth flanks of the gear to which the lubricant is applied will be referred to as the lubricant application area.

Figure 7:
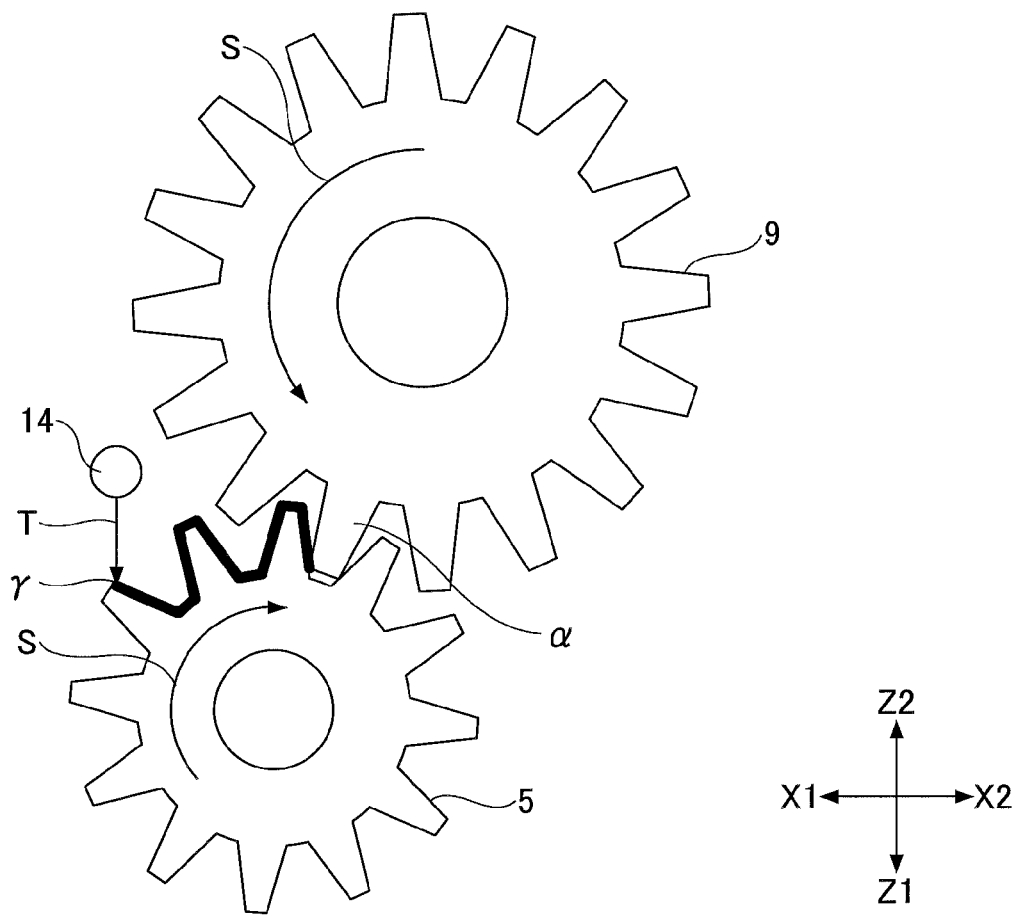
FIG. 7 is a diagram for explaining the function of the inlet opening in the gear drive apparatus of the first embodiment.
Figure 8:
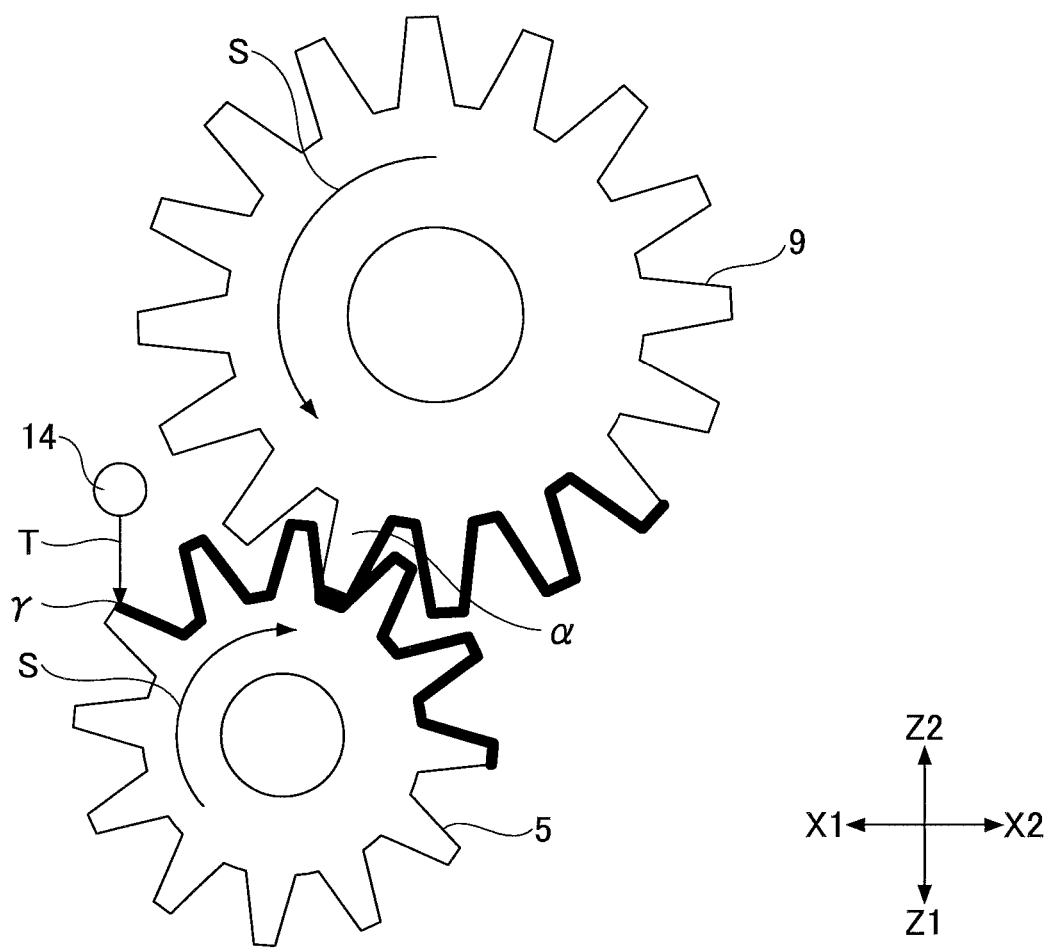
FIG. 8 is a diagram for explaining the function of the inlet opening in the gear drive apparatus of the first embodiment.

As the gear 5 is rotated clockwise, the lubricant application area is expanded to the tooth flanks of the gear 5 as indicated by the bold line shown in FIG. 7. As shown in FIG. 8, through the engagement area α where the gear 5 and the gear 9 are engaged together, the lubricant applied to the tooth flanks of the gear 5 is transferred to the tooth flanks of the gear 9. In this manner, the lubricant is supplied to all the tooth flanks of the gear 5, and, after a certain time passes, the lubricant is supplied to all the tooth flanks of the gear 9.

In the example of FIG. 6, the inlet opening 14 is formed in the side wall of the gearbox 1 at the location in the vicinity of the upstream part from the engagement area α where the gears (for example, the gears 6 and 9) are engaged together along the rotational direction of one of the gears. Thus, if the inlet opening 14 is formed in the location as shown in FIG. 6, the lubricant can be efficiently applied to all the tooth flanks of the gear 5 and the gear 9.

Figure 9:
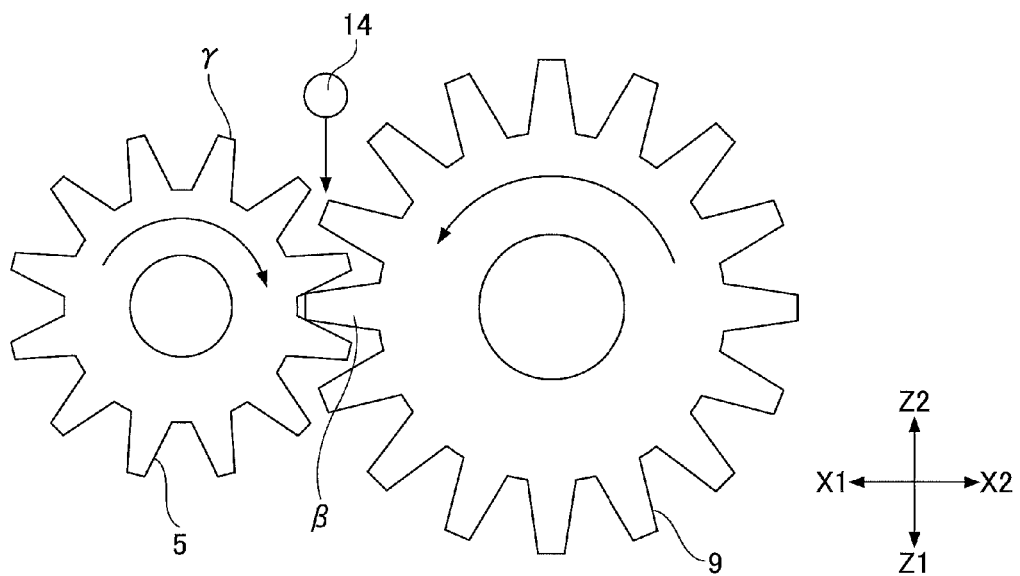
FIG. 9 is a diagram showing an inlet opening in a modification of the first embodiment of the present disclosure.

A modification of the first embodiment in which the inlet opening 14 is formed at another location will be described with reference to FIG. 9. FIG. 9 is a diagram for explaining a case in which the gear 5 and the gear 9 are arranged in a horizontal direction that is substantially parallel to the X-axis directions (X1 and X2). In this example, the area where the gear 5 and the gear 9 are engaged with each other will be referred to as the engagement area β. In the example of FIG. 9, the lubricant from the inlet opening 14 is initially poured to the engagement area β. That is, the engagement area β is equivalent to the inlet area to which the lubricant from the inlet opening 14 is initially applied.

In this case, the inlet opening 14 is located in a vicinity of the engagement area β, and is formed in the side wall of the gearbox 1 in the vicinity of the upper part (in the Z2 direction) of the engagement area β where the gears 5 and 9 are engaged together. In this case, if the inlet opening 14 is formed in the location shown in FIG. 9, the lubricant can be efficiently applied to all the tooth flanks of the gear 5 and the gear 9.

In the example of FIG. 9, the engagement area β is equivalent to the inlet area. Alternatively, the inlet area β may be located in the tooth flank area γ of one of the gears 5 and 9 at the upstream part from the engagement area β where the gears 5 and 9 are engaged with each other along the rotational direction of the one of the gears 5 and 9.

Next, as shown in FIG. 4, a plugging member 15 may be provided. The plugging member 15 is detachably attached to plug up the inlet opening 14. By plugging up the inlet opening 14 by the plugging member 15, it is possible to prevent entry of foreign matter (for example, garbage and dust) into the inlet opening 14 and leakage of the lubricant accommodated in the holding unit 30 from the inlet opening 14.

When the lubricant is not poured from the inlet opening 14, the inlet opening 14 is plugged up by the plugging member 15. When the lubricant is poured from the inlet opening 14, the operator removes the plugging member 15 from the inlet opening 14 and pours the lubricant from the inlet opening 14.

The plugging member 15 may be a screw and the inlet opening 14 may be formed into a screw hole in which the screw is fastened. In this case, the size of the inlet opening 14 (the screw hole) may be formed in the M5 size, for example. Thus, if the inlet opening 14 is formed into a screw hole and a screw is used as the plugging member 15, the operator can easily attach or detach the plugging member 15 to or from the inlet opening 14. Alternatively, a cap member of a snap fitting type may be used as another example of the plugging member 15. In this case, the inlet opening 14 may be formed into a through hole.

Next, a preferred size of the inlet opening will be described. FIG. 10 is a diagram showing a lubricant supplying unit 20 and the inlet opening 14 in the gear drive apparatus of the first embodiment. The lubricant supplying unit 20 is to supply the lubricant to the gearbox 1. The lubricant supplying unit 20 is, for example, a tube which is filled with the lubricant, or an injector which has no needle and is filled with the lubricant. In the example of FIG. 10, the inlet opening 14 and a nozzle opening 20*a* for injecting the lubricant from the lubricant supplying unit 20 to the inlet opening 14 are formed to have a circular cross-section. In FIG. 10, the illustration of the side wall 1*b* of the gearbox 1 is simplified for the sake of convenience. It is preferred that the outside diameter r2 of the inlet opening 14 in this case is equal to or larger than the outside diameter r1 of the nozzle opening 20*a*, i.e., r2≥r1. In the case of r2<r1, when the lubricant from the lubricant supplying unit 20 is supplied to the inlet opening 14, the lubricant may leak or the amount of the lubricant accommodated in the gearbox 1 may be too small due to leakage of the lubricant.

In the example of FIG. 10, the case in which the nozzle opening 20*a* and the inlet opening 14 have a circular cross-section has been described. Alternatively, the inlet opening 14 may be formed to have another cross-section, such as a rectangular cross-section.

FIG. 11 is a diagram for explaining a case in which the inlet opening 14 is formed to have a rectangle cross-section. In this case, it is necessary to make the inlet opening 14 larger in size than the nozzle opening 20*a* of the lubricant supplying unit 20. It is preferred that, when the lubricant from the lubricant supplying unit 20 is supplied, the area V1 of the nozzle opening 20*a* from which the lubricant is injected is fitted in the area V2 of the inlet opening 14 to which the lubricant is supplied. Namely, the size of the inlet opening 14 may be determined such that the lubricant from the lubricant supplying device does not leak when the lubricant is poured into the inlet opening 14.

Figure 12:
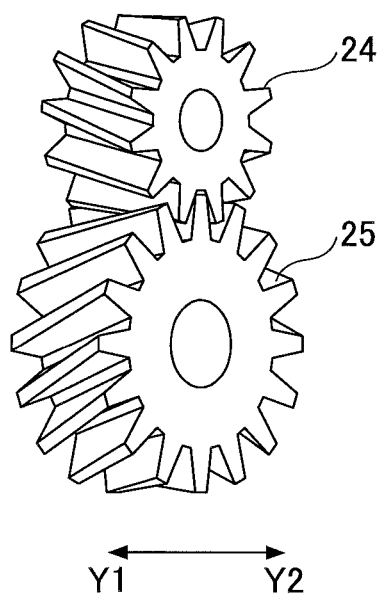
FIG. 12 is a perspective view of a helical gear.

Next, the kind of gears in the gear drive apparatus will be described. FIG. 12 is a perspective view of two helical gears 24 and 25 which are engaged with each other. In FIG. 12, the illustration of rotary shafts of the helical gears 24 and 25 is omitted. If the lubricant is supplied to the tooth flanks of the helical gears as shown in FIG. 12, the lubricant will be supplied in the rotary shaft directions (the Y-axis directions) of the helical gears by the rotation of the helical gears. Therefore, although the helical gears have a thickness, the lubricant can be applied to all the tooth flanks of the helical gears.

Thus, when at least one of the plurality of gears of the gear train is a helical gear, the lubricant can be efficiently applied to the tooth flanks of each gear. In the first embodiment as shown in FIG. 3, all seven gears are helical gears.

It is preferred that at least one of the plurality of gears in the gear train 200 is a metal gear. Metal gears have good lubricant retention and the lubricant applied to the tooth flanks improves the wear resistance of the metal gears.

For the same reason, it is preferred that at least one of the plurality of gears of the gear train is a sintered metal gear. Sintered metal gears have good lubricant retention and the lubricant applied to the tooth flanks improves the wear resistance of the sintered metal gears. Sintered metal gears are gears which are made of a sintered metal and produced by a blanking process.

In the gear drive apparatus of the first embodiment, the lubricant from the inlet opening 14 is initially supplied to the tooth flank area γ (refer to FIG. 6) at the upstream part from the engagement area β (refer to FIG. 9) where the gears are engaged together, or to the engagement area β. Therefore, the lubricant can be efficiently applied to all the tooth flanks of the gears.

Next, a gear drive apparatus of a second embodiment of the present disclosure will be described.

Figure 13:
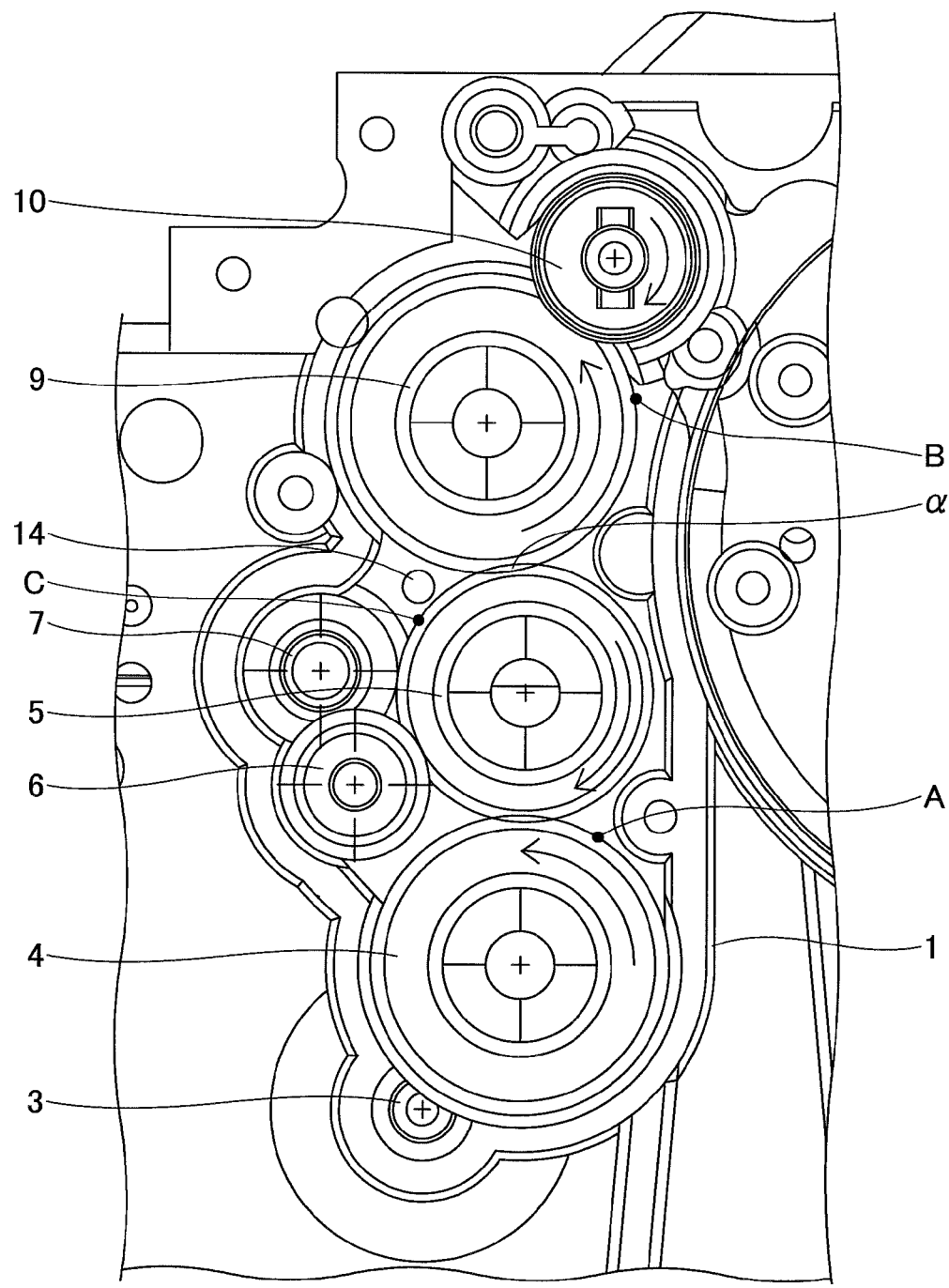
FIG. 13 is an enlarged view of a gear train in a gear drive apparatus of a second embodiment of the present disclosure.

With respect to the gear drive apparatus of the first embodiment, the case in which the two gears are provided and there is a single engagement area has been described. In the second embodiment of the present disclosure, a case in which there is a plurality of engagement areas will be described. FIG. 13 is an enlarged view of a gear train 200 of the gear drive apparatus of the second embodiment.

In the example of FIG. 13, there are six engagement areas where the gears are engaged together. In the first embodiment, the structure in which the inlet area is equivalent to the tooth flank area of one of the gears at the upstream part from the engagement area where the gears are engaged together along the rotational direction of the gear has been described. However, if the structure of the first embodiment is applied to the case of FIG. 13 and the part A of the gear 4 or the part B of the gear 9 as shown in FIG. 13 is determined as the inlet area, the lubricant may not be applied to all the tooth flanks of the seven gears.

In the second embodiment, the tooth flank area C at the upstream part from the engagement area α where the gears 5 and 9 (located in the center of the gear train 200 or in the vicinity of the center thereof) are engaged with each other along the rotational direction of the gear 5 is determined as the inlet area, and the lubricant will be supplied to the tooth flanks of the gears 3 and 10 located at the end portions of the gear train.

In the second embodiment, the plurality of engagement areas where the gears are engaged together are included in the gear train 200, and the tooth flank area C at the upstream part from the engagement area α (where the gears located in the center of the gear train 200 are engaged together) along the rotational direction of one of the gears is determined as the inlet area. In this manner, the lubricant is supplied to the tooth flanks of the gears located at the end parts of the gear train if the gear train includes the plurality of gears, and it is possible to efficiently apply the lubricant to all the tooth flanks of the gears.

In the second embodiment, the tooth flank area C at the upstream part from the engagement area α is determined as the inlet area. Alternatively, the engagement area α may be determined as the inlet area.

Next, a description will be given of a third embodiment of the present disclosure.

In the third embodiment, an image forming device which is provided with the gear drive apparatus of the first embodiment or the second embodiment will be described. Conventionally, in the gear train according to the related art, an inlet opening 13 into which the lubricant is poured, as shown in FIG. 14 and FIG. 15, is used.

Figure 14:
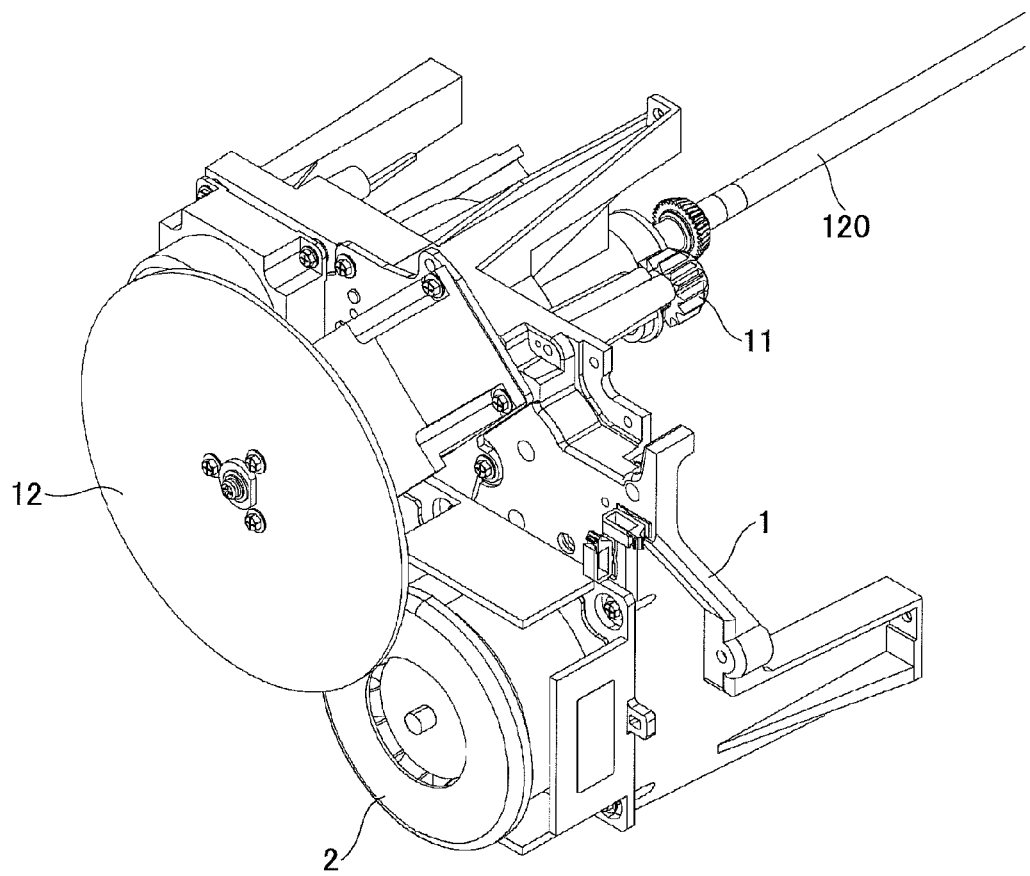
FIG. 14 is a perspective view of a gear train according to the related art.
Figure 15:
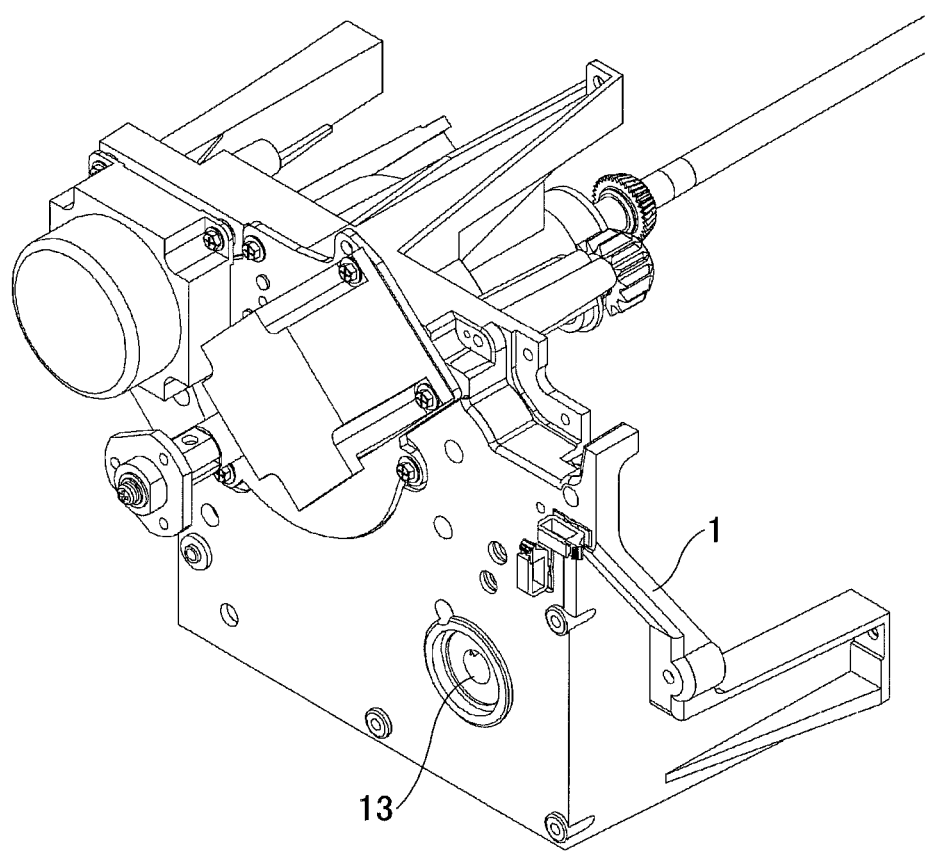
FIG. 15 is a perspective view of the gear train according to the related art of FIG. 14 when viewed from a different angle.

In the following, the inlet opening 13 in the gear train according to the related art as shown in FIG. 14 and FIG. 15 will be described. As shown in FIG. 14 and FIG. 15, when supplying the lubricant to the gear train according to the related art, an operator first removes the flywheel 12 from the exterior of the housing of the image forming device. Next, the operator removes the motor 2 and the cable connector (not shown) of the motor 2 from the exterior of the housing of the image forming device. The inlet opening 13 according to the related art is equivalent to a motor gear opening 13 of the motor 2. The operator pours the lubricant from the inlet opening 13 (or the motor gear opening 13) to the gear train. After the supply of the lubricant is performed, the operator attaches the motor 2 and the flywheel 12 to the gear train.

Accordingly, there has been a problem in that the operator has to remove the flywheel 12 and the motor 2 prior to the supplying of the lubricant to the gear train according to the related art, and has to attach the flywheel 12 and the motor 2 after the supplying of the lubricant is performed. Moreover, there has been also a risk of damaging the components (such as, gear tooth faces and cable connectors) near the flywheel 12 and the motor 2, when the flywheel 12 and the motor 2 are removed or attached. Further, as the inlet opening 13 is located at a lower portion of the gear train as shown in FIG. 15, the lubricant may not be appropriately supplied to the tooth flanks of a gear located at an upper portion of the gear train (for example, the gear 10 as shown in FIG. 3). Namely, in the gear train according to the related art, the location of the inlet opening 13 is fixed, and, when the gear train has a complicated structure, it will be difficult to appropriately supply the lubricant to the tooth flanks of a gear located at an end part of the gear train.

To eliminate such problems, the image forming device of this embodiment is arranged so that the inlet opening 14 is exposed to the outside surface of the gearbox 1 as shown in FIG. 3 and FIG. 4. The flywheel 12, the drive motor 2, etc. are components for driving the image forming device. In the following, such components which are arranged in the vicinity of the inlet opening outside the housing of the image forming device will be referred to as driving components.

In the image forming device of this embodiment, regardless of whether the driving components are attached or detached, the inlet opening is exposed to the outside surface of the gearbox 1 so that an operator is in a condition that the operator can pour the lubricant from the inlet opening 14.

In the image forming device of this embodiment, the inlet opening 14 is exposed to the outside surface of the gearbox 1, and, when the operator pours the lubricant from the inlet opening 14, there is no need for detaching or attaching the wheel 12 and the drive motor 2, and it is possible to eliminate the risk of damaging the wheel 12 and the drive motor 2.

Because the location of the inlet opening 14 may be determined freely, even when the gear train has a complicated structure, the lubricant from the inlet opening 14 can be initially supplied to the tooth flank area upstream from the engagement area where the gears located in the center of the gear train are engaged with each other, or to the engagement area. Hence, the lubricant can be efficiently applied to all the tooth flanks of the gears even when the gear train has a complicated structure.

In the third embodiment, the image forming device including the gear drive apparatus as a driving device has been described. However, the gear drive apparatus of the first embodiment or the second embodiment may be provided in another driving device. In this case, the inlet opening 14 is exposed to the outside surface of the gearbox 1 regardless of whether the driving components for driving the driving device are attached to the exterior of the housing of the driving device or not. By exposing the inlet opening 14 to the outside surface of the gearbox 1, the operator does not require removing or attaching the driving components when the operator supplies the lubricant to the driving device, and the risk of damaging the components in the vicinity of the driving components when the driving components are attached or detached can be eliminated.

As described in the foregoing, according to the present disclosure, it is possible to provide a gear drive apparatus, a driving device, and an image forming device which are capable of efficiently apply the lubricant to all the tooth flanks of the gears.

The present disclosure is not limited to the specifically disclosed embodiments, and variations and modifications may be made without departing from the scope of the present disclosure.

What is claimed is:

1. A gear drive apparatus comprising:
    a gear train including a plurality of gears;
    a holding unit accommodating the gear train and a lubricant to be supplied to tooth flanks of each of the plurality of gears, the holding unit including an inlet opening from which the lubricant is poured; and
    a plugging unit for plugging up the inlet opening,
    wherein the lubricant from the inlet opening is supplied to an engagement area where two gears of the plurality of gears are engaged with each other, or to a tooth flank area of one of the two gears at an upstream part from the engagement area along a rotational direction of the one of the two gears, and
    wherein the plugging unit is a screw and the inlet opening is a screw hole in which the screw is fastened.

2. The gear drive apparatus according to claim 1, wherein a plurality of engagement areas are included in the gear train, and the lubricant from the inlet opening is supplied to one of the plurality of engagement areas where two gears of the plurality of gears are engaged with each other, or to a tooth flank area of one of the two gears at an upstream part from the one of the plurality of engagement areas along a rotational direction of the one of the two gears.

3. The gear drive apparatus according to claim 1, wherein at least one of the plurality of gears is a helical gear.

4. The gear drive apparatus according to claim 1, wherein at least one of the plurality of gears is a metal gear.

5. The gear drive apparatus according to claim 1, further comprising a lubricant supplying unit having a nozzle opening for injecting the lubricant from the lubricant supplying unit to the inlet opening,
    wherein, when the lubricant from the lubricant supplying unit is supplied, an area of the nozzle opening for injecting the lubricant is fitted in an area of the inlet opening to which the lubricant is supplied.

6. A driving device which comprises the gear drive apparatus of claim 1 arranged in the driving device, wherein the inlet opening is exposed to an outside surface of the holding unit.

7. An image forming device which comprises the gear drive apparatus of claim 1 arranged in the image forming device, wherein the inlet opening is exposed to an outside surface of the holding unit.

8. A gear drive apparatus comprising:
    a gear train including a plurality of gears; and
    a holding unit accommodating the gear train and a lubricant to be supplied to tooth flanks of each of the plurality of gears, the holding unit including an inlet opening from which the lubricant is poured,
    wherein the lubricant from the inlet opening is supplied to an engagement area where two gears of the plurality of gears are engaged with each other, or to a tooth flank area of one of the two gears at an upstream part from the engagement area along a rotational direction of the one of the two gears, and
    wherein at least one of the plurality of gears is a sintered metal gear.

9. The gear drive apparatus according to claim 8, further comprising a plugging unit for plugging up the inlet opening.

10. The gear drive apparatus according to claim 8, wherein the plugging unit is a screw and the inlet opening is a screw hole in which the screw is fastened.

11. The gear drive apparatus according to claim 8, wherein a plurality of engagement areas are included in the gear train, and the lubricant from the inlet opening is supplied to one of the plurality of engagement areas where two gears of the plurality of gears are engaged with each other, or to a tooth flank area of one of the two gears at an upstream part from the one of the plurality of engagement areas along a rotational direction of the one of the two gears.

12. The gear drive apparatus according to claim 8, wherein at least one of the plurality of gears is a helical gear.

13. The gear drive apparatus according to claim 8, further comprising a lubricant supplying unit having a nozzle opening for injecting the lubricant from the lubricant supplying unit to the inlet opening,
    wherein, when the lubricant from the lubricant supplying unit is supplied, an area of the nozzle opening for injecting the lubricant is fitted in an area of the inlet opening to which the lubricant is supplied.

14. A driving device which comprises the gear drive apparatus of claim 8 arranged in the driving device, wherein the inlet opening is exposed to an outside surface of the holding unit.

15. An image forming device which comprises the gear drive apparatus of claim 8 arranged in the image forming device, wherein the inlet opening is exposed to an outside surface of the holding unit.

* * * * *